(No Model.) 2 Sheets—Sheet 2.

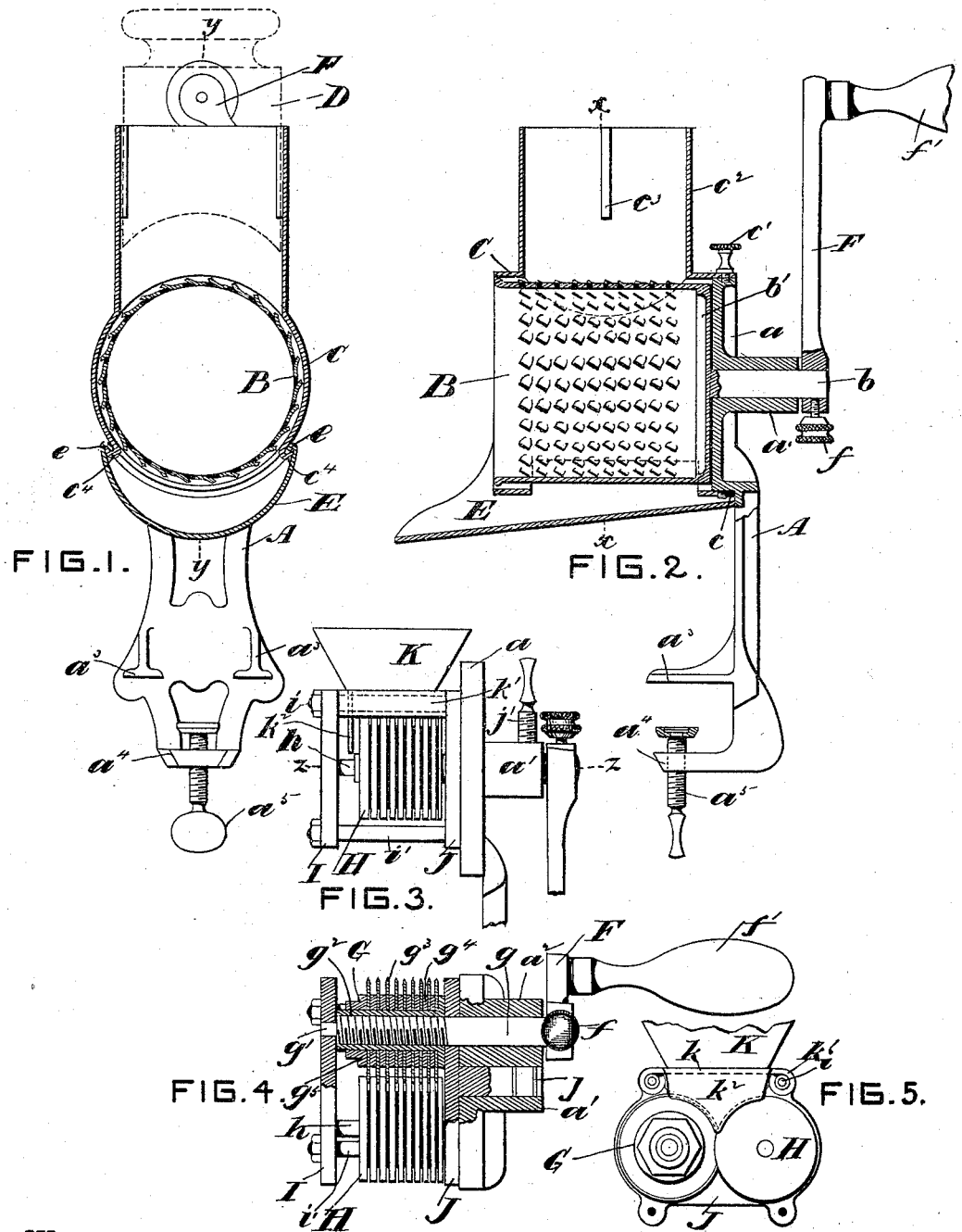

J. C. GROTE & P. A. DOBERT.
CULINARY GRATER AND SLICER.

No. 544,807. Patented Aug. 20, 1895.

WITNESSES.
Howard H. Ralston
Emma Lyford

INVENTORS.
Joseph C. Grote
Philip A. Dobert
By Geo. J. Murray Atty

UNITED STATES PATENT OFFICE.

JOSEPH C. GROTE, OF COVINGTON, KENTUCKY, AND PHILIP A. DOBERT, OF CINCINNATI, OHIO.

CULINARY GRATER AND SLICER.

SPECIFICATION forming part of Letters Patent No. 544,807, dated August 20, 1895.

Application filed December 5, 1894. Serial No. 530,871. (No model.)

*To all whom it may concern:*

Be it known that we, JOSEPH C. GROTE, a resident of Covington, in the county of Kenton and State of Kentucky, and PHILIP A. DOBERT, a resident of Cincinnati, in the county of Hamilton and State of Ohio, citizens of the United States, have invented certain new and useful Improvements in Culinary Graters and Slicers, of which the following is a specification.

Our invention relates to kitchen implements for grating vegetables—such as potatoes, turnips, &c., or the kernels of nuts or other articles used in cooking—and also for slicing certain vegetables, such as string-beans.

The purposes and objects of the invention will be fully understood from the following description of the accompanying drawings, in connection with which the invention will be first fully described, and then particularly referred to and pointed out in the claims.

Preliminary to a general description it is well to state that a single standard is adapted to receive either the grating device or slicing device, the two being interchangeably adapted to fit the frame and receive the handle or crank by which the device is operated.

Figure 6:
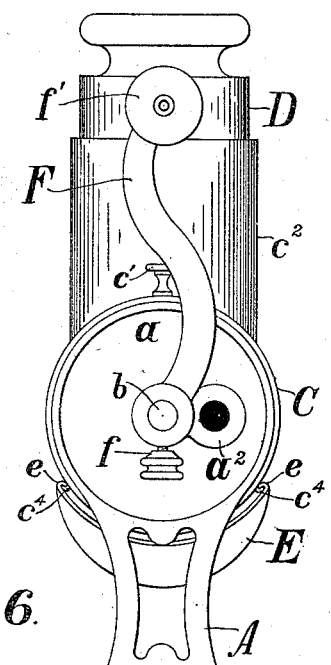
Figure 7:
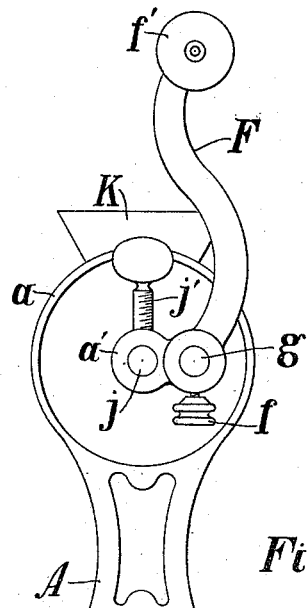
Figure 8:
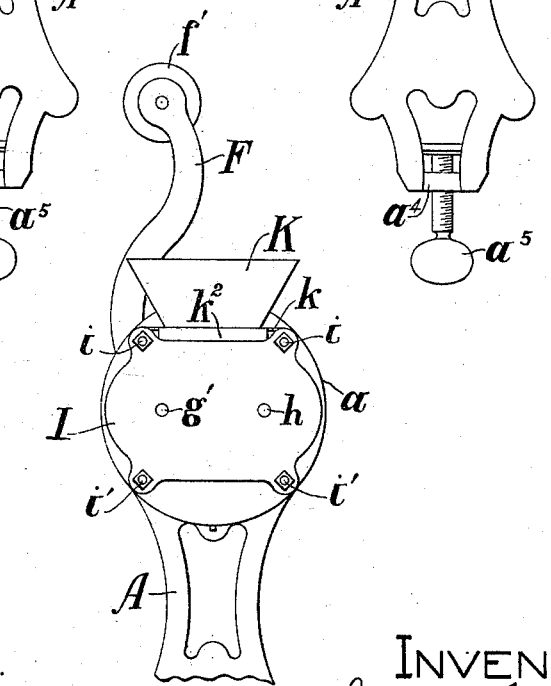

Referring to the drawings, in which like parts are indicated by similar reference-letters wherever they occur throughout the various views, Figure 1 is a vertical transverse sectional view of the device fitted to operate as a grater, the section being taken through line $x\ x$ of Fig. 2. Fig. 2 is a view, partly in side elevation and partly in vertical section, taken through line $y\ y$ of Fig. 1. Fig. 3 is a side elevation of the slicer applied to the frame or standard, the grating appliance being removed for this purpose. Fig. 4 is a view, partly in axial section and partly in elevation, the sectional view being taken through line $z\ z$ of Fig. 3. Fig. 5 is an end view of the slicing-cylinder with one of the plates removed and the upper portion of the hopper broken away. Fig. 6 is an end elevation of the device fitted to operate as a grater, taken at a right angle to the view shown in Fig. 2 and looking at the right-hand end of said figure. Fig. 7 is an end elevation of the device with the grater attachment removed and the slicer attached. Fig. 8 is an elevation, looking at the opposite end of the view shown in Fig. 7, with the lower portion of the frame broken away.

Referring first to the device with the grating attachment applied, as illustrated in Figs. 1, 2, and 6, A is the standard or support, which has cast integral with it a flanged annular disk $a$, having two laterally-projecting bosses $a'$ and $a^2$, the axially-projecting boss $a'$ to furnish a bearing for the shaft $b$ of the grating-cylinder B. The boss $a^2$ (shown in Figs. 4 and 6) furnishes a bearing for the shaft of the slicing-cylinder, as will be hereinafter described. The standard A has also projecting from its lower end bracket-arms $a^3$ and $a^4$, in the lower one of which is pivoted a thumb-screw $a^6$, the upper jaw $a^3$ acting as a clamping-jaw to rest upon the top of the table or other support, the screw $a^5$ clamping the frame in place. The grating-cylinder B is mounted upon the flanged disk $b'$, which is preferably cast integral with the bearing or journal shaft $b$.

C is a cylindrical housing for the grating-cylinder B. Its inner end is adapted to fit over the cylindrical flanged ring $a$ of the frame. The lower edge of the housing is notched at $c$ to pass a stud projecting down from the disk $a$, and the upper end opposite is perforated to receive a binding-screw $c'$, which passes through the flange of the housing and is tapped into the flange of the disk $a$ to hold the housing in place. The upper portion of the housing is provided with a cylindrical hopper or feed-spout $c^2$, which is provided with internal ribs $c^3$, and D (shown in dotted line, Fig. 1, and in full line, Fig. 6) is a follower having radial grooves upon opposite sides to fit the ribs $c^3$ within the feed-spout or hopper $c^2$. The lower edge of the follower D is curved to conform to the periphery of the grating-cylinder B.

A portion of the lower shell or housing C is cut away between its ends and the side walls of the cut-away portion turned outwardly to form flange $c^4$, which form locking ways or guides for the trough or discharge-spout E, which has inturned flanges $e$ to interlock with the outturned flanges $c^4$ of the housing.

If it is desired to grate vegetables—such as potatoes, turnips, &c.—the vegetables are placed in the spout or hopper $c^2$, the follower being placed over them. Then, one hand pressing on the follower, while the other hand operates the crank-arm F, the vegetables are grated and the pulp passed through to the interior of the grating-cylinder B. If is desired to press the juice out of the grated pulp, the handle is held rigidly with the hand, while the juice may be pressed out through the openings in the grating-cylinder into the trough or spout E, or the pulp with the juice in it may be removed from the interior of the cylinder without expressing the juice.

The grater is also especially adapted for grating almonds or the kernels of other nuts, the desired quantity being placed in the hopper $c^2$ and pressed down to the grating-cylinder by the follower D.

To remove the grating appliance from the standard A, the binding-screw $c'$ is first removed, when the housing with its attached gutter E may be taken off. The set-screw $f$ is then turned back, the crank-handle removed from the shaft $b$, and the grating-cylinder withdrawn. The standard is then adapted to receive the slicing attachment, which will now be described.

The slicing attachment consists of the knife-cylinder G and the grooved cylinder H, the two cylinders being journaled in bearings in the end plates I and J, held together by four stay-bolts $i$ and $i'$. The plate J has a shaft $j$ extending rearwardly from its center to enter the boss $a'$ of the standard A. The rear end of this shaft is transversely gained to furnish a seat for the screw $j'$, which is tapped through the boss and enters the seat in the shaft or shank $j$ to hold the cutting attachment rigidly secured to the annular disk $a$ of the standard. The knife-cylinder G consists of the central shaft $g$, one end of which passes through the plate J and the boss $a^2$ and protrudes beyond the boss to receive the crank-arm F, and the opposite end of the shaft having a reduced neck $g'$, which passes through the plate I, the flanged sleeve $g^2$, which is held upon the shaft $g$ by a screw-threaded connection, the cylindrical cutting-blades $g^3$, which pass over the sleeve $g^2$, the interposed washers $g^4$, and the nut $g^5$, which compresses the knives between the washers and the flanged end of the sleeve $g^2$ and holds them rigidly in position. The cylinder H, which is of soft metal, preferably zinc, is secured upon the shaft $h$, which has its bearings in the plates I and J. This cylinder is grooved to receive the cylindrical cutting-knives $g^3$. The hopper K is mounted upon a plate $k$, which has its ends turned around in eyes $k'$, through which the bolts $i$ pass to lock the hopper and its plate securely above the cylinders G and H. The plate $k$ has its opposite ends turned down, forming the aprons or guards $k^2$, as seen clearly in Figs. 5 and 8, the purpose of which is to prevent the beans or other vegetables to be sliced from passing outside of the cutting-blades.

In operating the slicing attachment, if it is desired to cut the beans or similar vegetables longitudinally or in strings the articles are fed into the hopper K vertically, while if it is desired to cut them into short pieces they are fed in angularly with one hand, while in either case the crank-arm is turned to operate the slicing-cylinders by the handle $f'$. The cutting-blades $g^3$ are shown detachably secured upon the sleeve $g^2$ by the interposed washers $g^4$ and nut $g^5$ in order that the blades may be removed from the shaft, if desired, for the purpose of sharpening them; but it would be an inferior modification of the invention to make the cutting-cylinder with its bearings and knives integral instead of detachably connecting the knives to the cylinder, as shown, and the grooved cylinder, which is shown of a single piece grooved and secured upon its journal, may be made of separate disks with interposed washers, so that they may also be made to be detachably held upon the shaft, if desired.

It is also obvious that there may be many merely mechanical changes made without departing from the spirit or scope of the invention. Hence, Without limiting ourselves to the specific details of construction shown, what we claim as new, and desire to secure by Letters Patent, is—

1. The support for a culinary grater and slicer substantially as herein before set forth, which consists of the standard, A, having at one end a clamping attachment to be fixed to a rigid support, and at the opposite end a flanged disk having projecting from it two perforated bosses, one to receive the axis of the grating cylinder and the support for the cutting attachment, and the other one to receive the journal of the slicing attachment.

2. The combination of the standard, A, adapted to be secured to the support and having a flanged disk, $a$, and protruding bosses, $a'$ and $a^2$, the slicing attachment consisting of the slicing cylinder, G, and grooved cylinder, H, the plate, J, having rearwardly projecting shaft, $j$, to enter the boss, $a'$ of the support, to furnish journals for the slicing and grooved cylinders, the plates, I, journaling the slicing and grating cylinders, stay bolts for holding the plates, I and J, together, the set screw for holding the slicing attachment in position, and the crank shaft for revolving the slicing cylinder, substantially as shown and described.

3. The supporting standard for the slicing and grating attachment, having perforated bosses to receive the driving shafts of the slicing and grating cylinders, in combination with the grating and slicing cylinders, adapted to be detachably connected to said standard and interchangeably used with the same, substantially as shown and described.

JOSEPH C. GROTE.
PHILIP A. DOBERT.

Witnesses:
EMMA LYFORD,
GEO. J. MURRAY.